Figure 1:
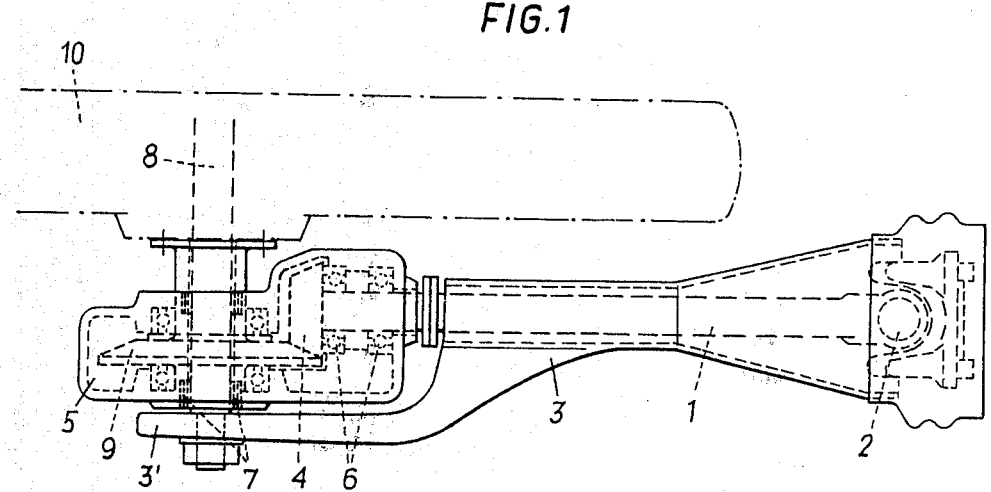

United States Patent [19]

Leitner

[11] 4,336,859
[45] Jun. 29, 1982

[54] CARDAN DRIVE FOR MOTORCYCLES

[76] Inventor: Horst Leitner, Dr.-Th.-Körner-Strabe 33, in Bruck a.d. Mur, Steiermark, Austria

[21] Appl. No.: 137,152

[22] Filed: Apr. 4, 1980

[51] Int. Cl.³ .............................. B62M 17/00
[52] U.S. Cl. ............................ 180/226; 180/227
[58] Field of Search .......... 280/226, 227, 231, 73 TL, 280/73 R

[56] References Cited
U.S. PATENT DOCUMENTS
1,324,242  12/1919  Fisker .................... 180/226 X FOREIGN PATENT DOCUMENTS
177074   5/1953  Austria.
1055981 10/1959  Fed. Rep. of Germany.
595545  12/1947  United Kingdom ........ 180/226

Primary Examiner—John A. Pekar
Attorney, Agent, or Firm—Martin A. Farber

[57] ABSTRACT

A Cardan drive for motorcycles in connection with which the housing, within which the ring gear connected with the rear wheel is contained and the pinion connected with the Cardan shaft is mounted is supported via an upwardly extending control arm operatively connected to a guide member pivoted to the frame at a point thereof lying above the swing arm of the rear wheel.

8 Claims, 3 Drawing Figures

CARDAN DRIVE FOR MOTORCYCLES

The present invention relates to a Cardan drive for motorcycle rear wheels mounted on a suspension arm in connection with which the housing, within which the pinion connected with the Cardan shaft is supported and the ring gear connected with the rear wheel is contained, is supported for turning with respect to the swing arm and is supported via a guide member on the frame by an arm which is rigidly connected to the housing.

In the known Cardan drives, the housing, within which the pinion connected with the Cardan shaft is mounted and within which the ring gear which is connected with the rear wheel and into which the pinion engages is also contained, is rigidly connected with the rear wheel swing arm. By this rigid connection, obtained either by the fact that the housing is supported on the swing arm or forms a structural part rigidly connected with the swing arm—in the latter case the Cardan shaft itself is contained within the swing arm which is developed hollow—moments of force which, depending on the direction of rotation of the cardan drive, lead to an extension or retraction of the rear wheel suspension of the motorcycle, act on the rocker arm, particularly upon acceleration. Both have a detrimental effect on the road-holding capabilities, particularly when traveling around curves.

In Austrian Pat. No. 177,074 and West German Pat. No. 1,055,981 there are shown Cardan drives of the aforementioned type by which the problem of a suspension of the rear wheel swing arm which is free of forces of reaction in the case of cardan drives is to be solved. One disadvantage of the known proposed solutions is that the supporting is always effected below the rear wheel swing arm. This is disadvantageous insofar as due to the necessary road clearance only short lever arms (distance between the point of action of the support on the housing and the rear wheel axle on the one hand and the distance between the swing-arm bearing and the point of action of the support on the motorcycle frame on the other hand) are possible, so that as a whole unfavorable conditions result. Nevertheless, there is the danger that the support will be bent or otherwise damaged when, for instance, traveling over difficult terrain.

The object of the present invention is to create a cardan drive for swing-arm-mounted rear wheels of motorcycles which does not have the above-indicated disadvantages.

In accordance with the invention this result is obtained in the manner that the guide member is pivoted to a point of the frame which lies above the swing arm.

Due to the fact that the support in accordance with the invention is pivoted to the frame above the swing arm, the lever arms can be greater than in the case of the known supports so that the resultant forces are less and the support as a whole can be made weaker, i.e. lighter. In addition the danger of damage is excluded.

In one embodiment it can be contemplated that guide member and control arm are developed together as a telescopic mechanism of variable length. In this case it is favorable for the telescopic mechanism formed of a guide member and swing arm to be developed, in addition, as a telescopic fork and/or shock absorber for the rear wheel swing arm.

Figure 2:
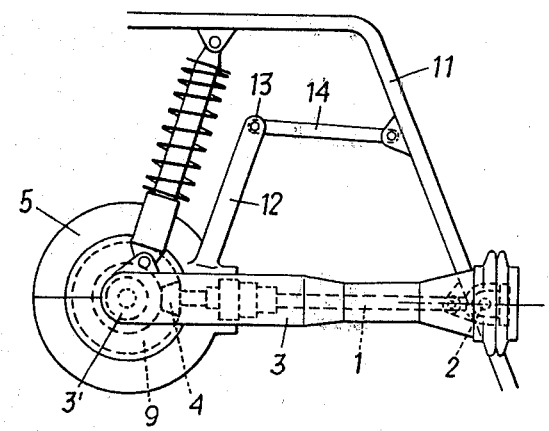
Figure 3:
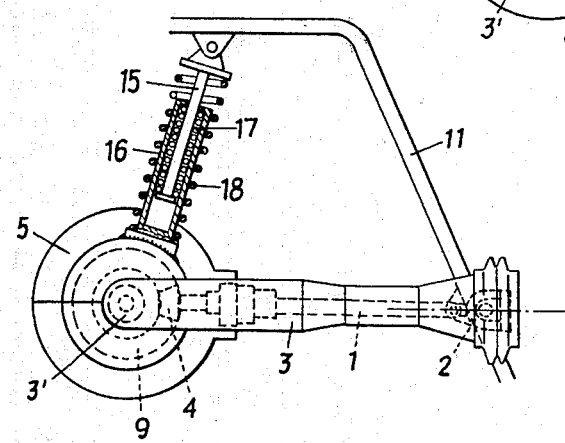

Further details of the invention will be explained with reference to the illustrative embodiments shown in the drawing, in which FIG. 1 shows the cardan drive of the invention in top view, and FIGS. 2 and 3 show two variants of the support of the housing on the frame of the motorcycle.

The drive shown in FIG. 1 comprises a Cardan shaft 1 which is connected via a Cardan joint 2, in a manner not shown in detail in the drawing, with the transmission of the motorcycle. The Cardan shaft 1 is contained in a hollow swing arm 3 and is connected via a coupling with the shaft end which bears the pinion 4 the end being supported in a housing 5 via ball bearings 6. The coupling makes it possible for the Cardan shaft 1 to extend at an angle to the end which bears the pinion 4. Instead of the coupling a second Cardan joint can also be provided. The housing 5 is mounted on the motorcycle rear axle 8, in a manner which is freely movable with respect to the housing end 3' which extends along its side, for example by needle bearings or bearing bushings 7. Within the housing 5 there is furthermore contained a ring gear 9 which is connected with the rear wheel 10, indicated by dot-dash line.

In the embodiment of the support of the housing 5 on the frame 11 which is shown in FIG. 2, an arm 12 whose other end 13 is pivoted via a guide arm 14 to the frame 11 is rigidly connected to the housing 5. By means of the arm 12 all moments of force which come from the drive forces or the forces produced upon the braking of the motor and act on the housing 5 are taken up by the frame 11 so that no forces coming from the drive act any longer on the swing arm 3 itself.

FIG. 3 shows, in a view similar to FIG. 2, another possibility for the supporting of the housing 5 on the frame 11. In this case the guide rod 15 which is pivoted to the frame 11 engages in sliding manner into the arm 16 which is developed as a telescopic tube. This embodiment affords the possibility of combining the moment of rotation support for the housing 5, as indicated, with the spring suspension 18 and/or shock absorber of the rear wheel swing arm 3. In order to reduce the frictional forces between the arm 16 and guide rod 15 rollers 17 can be provided between these structural parts.

Instead of the telescopic tube 15, 16 shown in FIG. 3, some other telescopically longitudinally adjustable rod can also be provided. Similarly, the guide member 15 can be developed a tube and the arm 16 a rod displaceable therein.

Regardless of whether the arm 16 is developed as a tube or rod it can be welded to the housing 5, bolted to it or else developed integral with it.

I claim:

1. In a Cardan drive for a motorcycle rear wheel supported by a swing arm pivoted to a frame and a housing is supported pivotally with respect to the swing arm and is connected via a guide member on the frame by means of a control arm, the latter being rigidly connected to the housing, and within the housing a pinion connected with a Cardan shaft is supported and a ring gear engaging with the pinion connected with the rear wheel is contained, the improvement wherein said guide member is pivoted to a point on the frame disposed above the swing arm.

2. The drive according to claim 1, wherein said guide member and said control arm are cooperatively formed as a telescopic system of variable length.

3. The drive according to claim 2, wherein
said telescopic system comprising said guide member and said control arm further include at least one spring means operatively connected between said guide member and said control arm and simultaneously comprises a shock absorber for the swing arm.

4. The drive according to claim 3, wherein
said at least one spring means includes an outermost spring abutting one end of said control arm and an opposite end of said guide member and an innermost spring disposed between said control arm and said guide member abutting the opposite end of said control arm and another end of said guide member.

5. The drive according to claim 1, wherein
said control arm extends upwardly from said housing.

6. The drive according to claim 5, wherein
said control arm is pivoted to said guide member.

7. The drive according to claim 1, further comprising
a rear wheel shock absorber means for absorbing shocks transmitted from the ground through the swing arm,
said control means extends substantially parallel to said shock absorber means.

8. The drive according to claim 7, wherein
said shock absorber means is mounted directly on said swing arm.

* * * * *